United States Patent
Cabillic et al.

(10) Patent No.: US 7,543,285 B2
(45) Date of Patent: Jun. 2, 2009

(54) METHOD AND SYSTEM OF ADAPTIVE DYNAMIC COMPILER RESOLUTION

(75) Inventors: Gilbert Cabillic, Brece (FR); Jean-Philippe Lesot, Etrelles (FR)

(73) Assignee: Texas Instruments Incorporated, Dallas, TX (US)

( * ) Notice: Subject to any disclaimer, the term of this patent is extended or adjusted under 35 U.S.C. 154(b) by 630 days.

(21) Appl. No.: 11/189,410

(22) Filed: Jul. 26, 2005

(65) Prior Publication Data

US 2006/0026575 A1 Feb. 2, 2006

(30) Foreign Application Priority Data

Jul. 27, 2004 (EP) .................... 04291918

(51) Int. Cl.
*G06F 9/45* (2006.01)
(52) U.S. Cl. .................... 717/158; 717/159; 717/146; 717/148
(58) Field of Classification Search ........... 717/145, 717/146–148, 151, 153–159
See application file for complete search history.

(56) References Cited

U.S. PATENT DOCUMENTS

| | | | | |
|---|---|---|---|---|
| 5,950,007 | A * | 9/1999 | Nishiyama et al. ........... | 717/146 |
| 6,078,744 | A * | 6/2000 | Wolczko et al. ............. | 717/159 |
| 6,530,075 | B1 * | 3/2003 | Beadle et al. ............... | 717/114 |
| 6,745,384 | B1 * | 6/2004 | Biggerstaff ................. | 717/156 |
| 7,000,227 | B1 * | 2/2006 | Henry ........................ | 717/158 |
| 7,017,154 | B2 * | 3/2006 | Haber et al. ................. | 717/158 |
| 7,146,607 | B2 * | 12/2006 | Nair et al. .................... | 717/151 |
| 7,185,330 | B1 * | 2/2007 | Khu ............................ | 717/152 |
| 7,194,736 | B2 * | 3/2007 | Shi et al. .................... | 717/153 |
| 2003/0093780 | A1 * | 5/2003 | Freudenberger et al. .... | 717/153 |

OTHER PUBLICATIONS

Lee, et al., "A Declarative Approach to Run-Time Code Generation"; Carnegie Mellon University, 1996.*
Leone, et al., "Lightweight Run-Time Code Generation"; ACM Sigplan, 1994.*
Yeung et al., "Dynamic Instrumentation for Java Using a Virtual JVM", Imperial College, UK, 2002.*
Calder et al., "Value Profiling and Optimization", Journal of Instruction-Level Parallelism, 1996, 33 pgs.*
Childers et al., "Continuous Compilation: A New Approach to Aggressive and Adaptive Code Transformation", International Parallel and Distributed Processing Symposium, 2003, 10pgs.*

* cited by examiner

*Primary Examiner*—Wei Y Zhen
*Assistant Examiner*—Ryan D. Coyer
(74) *Attorney, Agent, or Firm*—Ronald O. Neerings; Wade James Brady, III; Frederick J. Telecky, Jr.

(57) ABSTRACT

A method and system of adaptive dynamic compiler resolution. At least some of the illustrative embodiments are a computer-implemented method comprising compiling a source file containing an application program (the application program comprising a method, and wherein the compiling creates a destination file containing a compiled version of the application program), and inserting in the compiled version of the application program a series of commands that (when executed at run time of the application program) generate a first optimized version of the method using a first value available at run time, and generate a second optimized version of the method using a second value available at run time.

17 Claims, 7 Drawing Sheets

US 7,543,285 B2

METHOD AND SYSTEM OF ADAPTIVE DYNAMIC COMPILER RESOLUTION

CROSS-REFERENCE TO RELATED APPLICATIONS

This application claims the benefit of European Patent Application No. 04291918.3, filed Jul. 27, 2004, incorporated by reference herein as if reproduced in full below. This application is related to co-pending and commonly assigned application Ser. No. 11/189,411 "Method And Related System Of Dynamic Compiler Resolution."

BACKGROUND OF THE INVENTION

1. Technical Field of the Invention

Embodiments of the present invention relate to compilers and creation of optimized executable code.

2. Background Information

A compiler is a software program that takes a source file containing a program in a particular form, and converts the program to another form. In some cases, the compiler starts with a human-readable source code file (e.g. a program written in JAVA™ or C++) and converts or compiles to a binary file that may be directly executable or that may require interpretation or further compiling.

Compilers come in several varieties, such as static compilers (sometimes referred to as "ahead-in-time" compilers) or dynamic compilers (sometimes referred to as "just-in-time" compilers). Static compilers complete their work on the source file before the program is executed. Dynamic compilers, by contrast, compile the source file during execution of the program embodied in the source file. Both static and dynamic compilers also may perform optimization as part of the compiling processing, possibly to reduce execution time.

Static compilers perform some optimizations, such as inlining of methods, but in many cases optimization requires the knowledge of values of runtime parameters which are not known when static compiling is performed. Dynamic compilers thus have the advantage of having available the values of runtime parameters, and thus may make optimizations based on those parameters, but gain realized by optimization performed by dynamic compilers is offset by the fact the compiler too is running and sharing time on the processor, thus slowing the overall execution of the application program.

SUMMARY

The problems noted above are solved in large part by a method and system of adaptive dynamic compiler resolution. At least some of the illustrative embodiments are a computer-implemented method comprising compiling a source file containing an application program (the application program comprising a method, and wherein the compiling creates a destination file containing a compiled version of the application program), and inserting in the compiled version of the application program a series of commands that (when executed at run time of the application program) generate a first optimized version of the method using a first value available at run time, and generate a second optimized version of the method using a second value available at run time.

Other illustrative embodiments are computer readable medium storing a compiler program that performs a method comprising compiling source code of an application program comprising a subroutine (the compiling creates a compiled version of the application program), and inserting in the compiled version of the application program a series of commands that (when executed at run time of the application program) generate a first optimized version of the subroutine using a first value available at run time, and that generate a second optimized version of the subroutine using a second value available at run time.

Yet still other illustrative embodiments are a system comprising a memory (the memory contains a source file of a program, and the program contains a method), and a first processor coupled to the memory. The first processor is configured to compile the program of the source file to create a compiled program, and the processor is configured to insert in the compiled program a series of commands that (when executed at run time of the program) generate a first optimized version of the method using a first value available at run time, and generate a second optimized version of the method using a second value available at run time.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiments is meant only to be exemplary of those embodiments, and not intended to intimate that the scope of the disclosure is limited to those embodiments.

Moreover, the various embodiments were developed in the context of processors executing Java™ bytecodes, and thus the description is related to the developmental context; however, the various embodiments find application outside the Java environment, such as Microsoft's ".NET" (pronounced "dot net") framework or in programs written in C and C++, and thus the description in relation to a Java environment should not be construed as a limitation as to the breadth of the disclosure.

Java is a programming language that, at the source code level, is similar to object oriented programming languages such as C++. Java language source code is compiled into an intermediate representation based on a plurality hardware platform independent "bytecodes" that define specific tasks. An "opcode" is a single member of the group bytecodes. In some implementations, the bytecodes are further compiled to machine language for a particular processor. Some processors, however, are designed to execute some or all the Java bytecodes directly.

Figure 1:
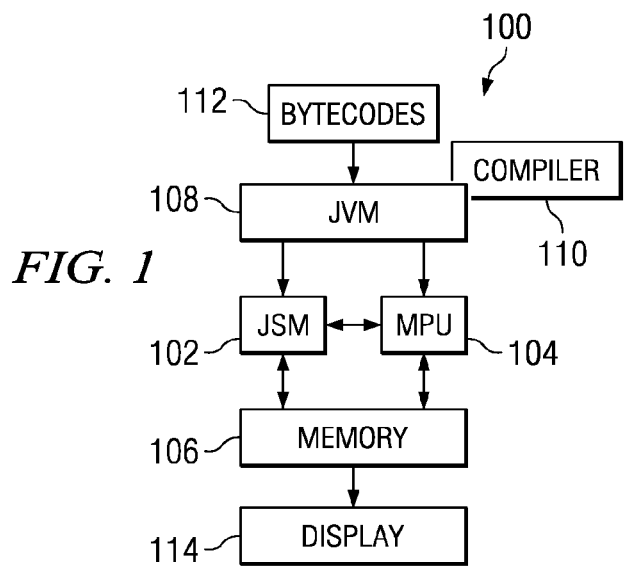
FIG. 1 shows a diagram of a system in accordance with embodiments of the invention.

FIG. 1 shows a system 100 in accordance with embodiments of the invention. As shown, the system may comprise at least two processors 102 and 104. Processor 102 may be referred to for purposes of this disclosure as a Java Stack Machine ("JSM") and processor 104 may be referred to as a Main Processor Unit ("MPU"). System 100 may also comprise memory 106 coupled to both the JSM 102 and MPU 104. At least a portion of the memory 106 may be shared by both processors, and if desired, other portions of the memory 106 may be designated as private to one processor or the other. System 100 also comprises a Java Virtual Machine ("JVM") 108, compiler 110, and a display 114. The JVM 108 may comprise a class loader, bytecode verifier, garbage collector, and a bytecode interpreter loop to interpret the bytecodes that are not executed on the JSM processor 102. Other components (not specifically shown) may be used as desired for various applications.

Bytecodes 112 may be provided to the JVM 108, possibly compiled by compiler 110, and provided to the JSM 102 and/or MPU 104 for execution. In accordance with some embodiments of the invention, the JSM 102 may execute at least some Java bytecodes directly. When appropriate, however, the JVM 108 may also request the MPU 104 to execute one or more Java bytecodes not executed or executable by the JSM 102. In addition to executing compiled Java bytecodes, the MPU 104 also may execute non-Java instructions. The MPU 104 may thus also host an operating system ("O/S") (not specifically shown) which performs various functions such as system memory management, system task management that schedules the software aspects of the JVM 108 and most or all other native tasks running on the system, management of the display 114, and receiving input from input devices (not specifically shown). Java code, whether executed on the JSM 102 or MPU 104, may be used to perform any one of a variety of applications such as multimedia, games or web based applications in the system 100, while non-Java code, which may comprise the O/S and other native applications, may still run on the system on the MPU 104.

Figure 2:
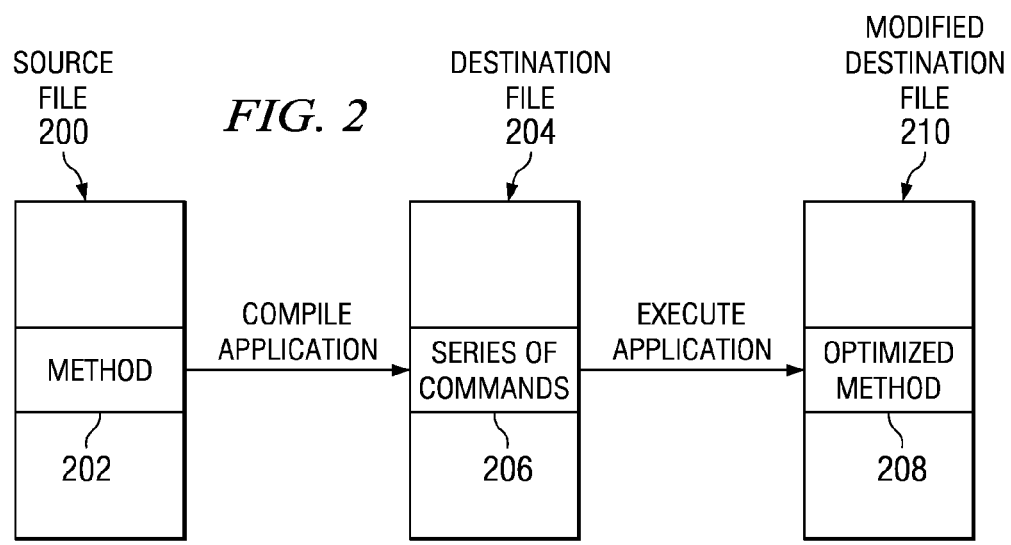
FIG. 2 illustrates graphically operation of a compiler and application program in accordance with embodiments of the invention.

FIG. 2 graphically illustrates operation of a compiler and an application program in accordance with embodiments of the invention. In particular, FIG. 2 illustrates a source file 200, which source file contains an application program comprising, at least in part, a method 202. The method 202 could be, for example, a subroutine of the larger application program. The application program of the source file 200 is compiled (such as by compiler 110 of FIG. 1), and the results of the compiling are placed in a destination file 204. In some embodiments the source file is human-readable source code, such as written in Java or C++. In other embodiments, the application program of the source file 200 may be code that is already at least partially compiled, such as a Java language application program compiled to bytecodes. The results of the compiling may likewise take many forms. The compiled version of the application program may be executable directly or indirectly by a processor. For example, Java language human-readable source code may be compiled to bytecodes which are directly executable by some processors (such as JSM 102), or which need further compiling to platform dependent instruction sets for processors that do not directly execute bytecodes (such as MPU 104).

Regardless of the form of the source and destination files, in accordance with embodiments of the invention the compiler inserts into the compiled version of the application program in the destination file a series of commands 206. The terms "series of commands" are used to distinguish the original method; however, the series of commands may be another method of the application program, albeit drafted by the compiler rather than the author of the source code. The series of commands 206 are generated by the compiler such that when the application program is actually executed, and in particular when the series of commands 206 as part of the application program are executed, the series of commands determine a value of a parameter which is available at runtime (and which may not have been available in a static compiling), and the series of commands generate an optimized version of the method based on the value. For example, an indirect reference both in the human-readable source code file and the compiled version of the application program may be resolved at run time, and the illustrative method may be optimized using the resolved value.

In accordance with at least some embodiments, the series of commands may be executed multiple times, and each time generate the optimized version of the method that is thereafter executed. In alternative embodiments, however, the series of commands 206 are further configured to replace themselves with the optimized method 208, thus creating a modified destination file 210. In these embodiments, the series of commands execute one time, to determine the value of interest, generate an optimized method based on that value, and overwrite the series of commands with the optimized method.

Figure 3:
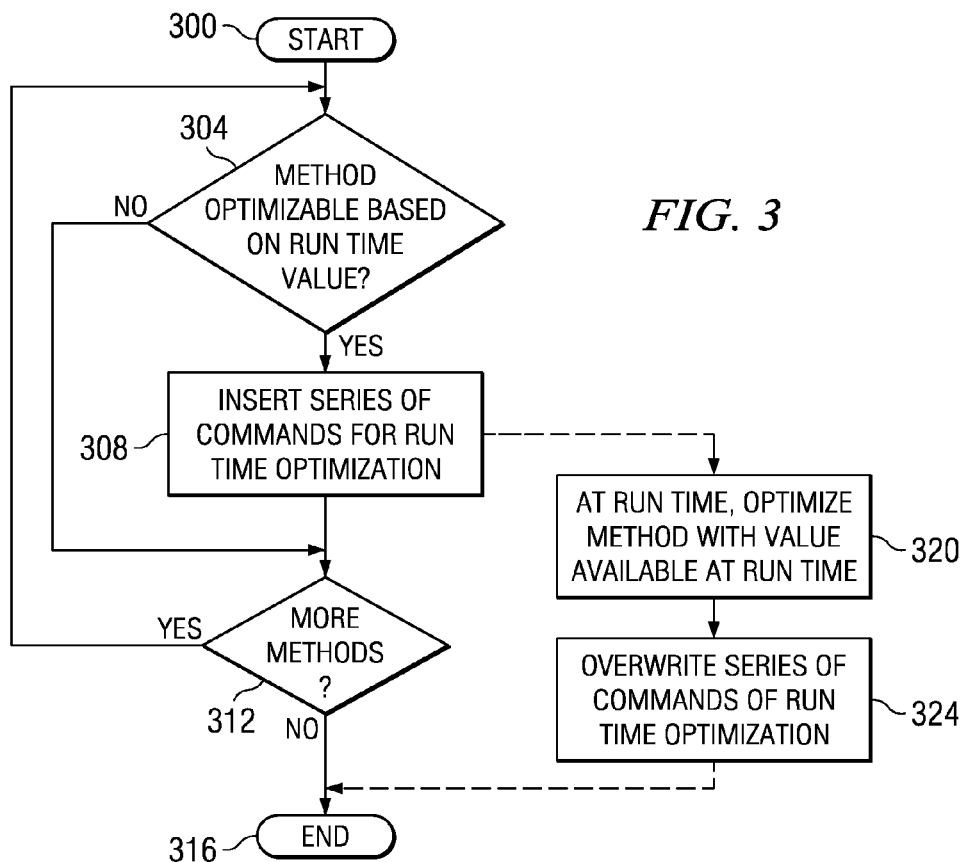
FIG. 3 illustrates a flow diagram implemented partially within a compiler and partially within an application program compiled by the compiler, in accordance with embodiments of the invention.

FIG. 3 illustrates a flow diagram that is implemented partially within a compiler, and partially within an application program compiled by the compiler. More particularly, FIG. 3 illustrates the operation of the compiler and modified application program as discussed with respect to FIG. 2. The process starts (block 300), and in addition to other duties of the compiler, a determination is made as to whether a method (e.g., method 202 of FIG. 2) can be optimized based on a value available at run time (block 304). If not, a determination is made as to whether other methods exist in the application program for possible optimization (block 312). If there are no further methods, the process ends (block 316). If there are further methods, however, the process starts anew with the determination of whether the next method can be optimized based on a value available at run time (again block 304).

Still referring to FIG. 3, if a method can be optimized based on a run time value, the compiler inserts a series of commands into the compiled version of the application program for generating, at run time of the application program, an optimized version of the method (block 308). Thereafter, a determination is made as to whether more methods exist for possible run time optimization (block 312). The illustrative steps of FIG. 3 discussed to this point are preferably implemented within a compiler. The remaining steps (blocks 320 and 324) are preferably implemented as part of the application program previously (wholly or partially) compiled by the compiler.

The series of commands, executed as part of the application program and not the compiler program, generate the optimized method using the value available at run time (block 320). Moreover, and in at least some embodiments, the series of commands overwrite themselves with the optimized method (block 324). In some embodiments the series of commands are overwritten only in the copy of the application program stored in volatile memory (e.g., RAM), but not in the compiled version of the application stored on a non-volatile memory (e.g., a disk drive). If the value available at run time is expected to the same each and every time the application program thereafter runs, then the series of commands may also be overwritten on non-volatile memory device.

Figure 4:
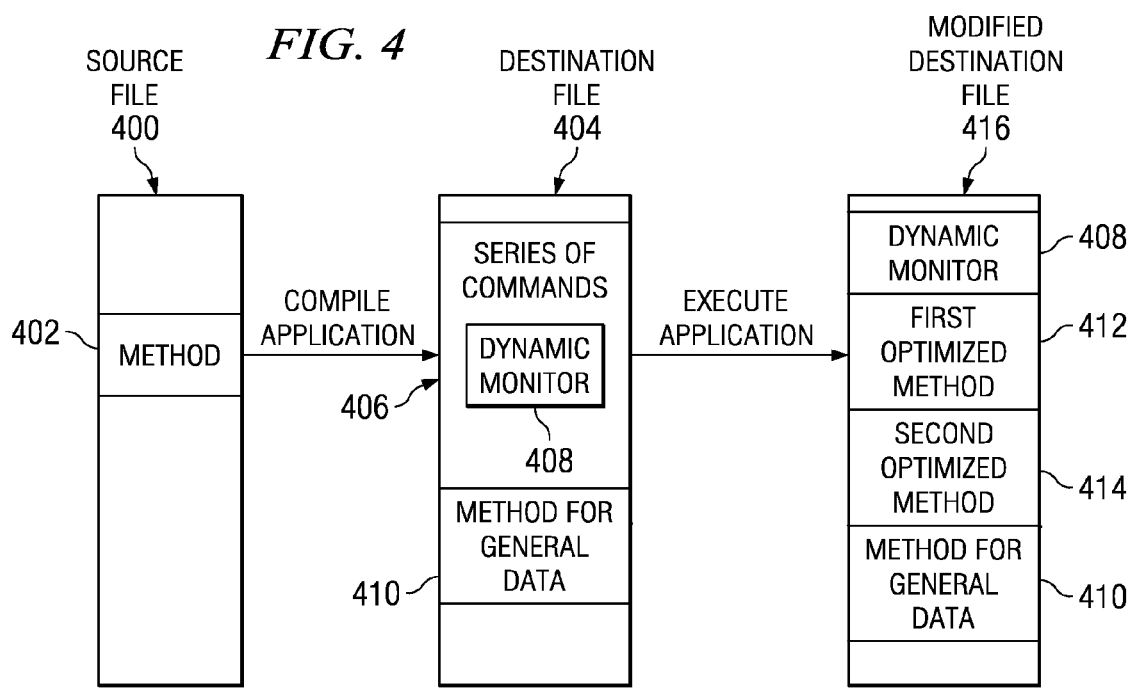
FIG. 4 illustrates graphically operation of a compiler and application program in accordance with alternative embodiments of the invention.

The discussion of the various embodiments to this point has assumed that sufficient optimization of the overall application program may be achieved with an optimized method for only one run time value, and this assumption is valid in many situations. In alternative embodiments, however, an illustrative method may be optimized based on several values available at run time, and further still, the values for which the method is optimized may change over the course of the execution of the application program. FIG. 4 illustrates operation of a compiler and an application program in accordance with alternative embodiments of the invention. In particular, FIG. 4 illustrates a source file 400, which source file contains an application program comprising, at least in part, a method 402. The method 402 could be, for example, a subroutine of the larger application program. The application program of the source file 400 is compiled (such as by compiler 110 of FIG. 1), and the results of the compiling are placed in a destination file 404. Much like the embodiments discussed with respect to FIG. 2, the source file and destination may take many forms.

In accordance with these alternative embodiments, the compiler inserts into the compiled version of the destination file a series of commands 406. The series of commands 406 are generated by the compiler such that when the application program is actually executed, and in particular when the series of commands 406 as part of the application program are executed, the series of commands perform several actions. In particular, the series of commands may implement dynamic monitoring code 408 (discussed more fully below), and may also determine a value or values of parameters which are available at run time (and which may not have been available in a static compiling). Further, the series of commands 406 also generate optimized versions of the method based on the value or values determined by the dynamic monitoring code 408.

In accordance with these alternative embodiments, the dynamic monitoring code 408 runs as part of the application program, and determines which run time values are predominantly used by the method 410 (which is method 402 compiled and optimized (to the extent possible) for general data). The terms "dynamic monitoring code" are used to distinguish the original method; however, the dynamic monitoring code may be another method of the application program, albeit drafted by the compiler rather than the author of the source code. Stated otherwise, the dynamic monitoring code 408 (part of the series of commands written by the compiler) monitors a plurality of executions of the method 410, and determines which run time values are predominantly used. Based on this determination, the series of commands 406 then generate a plurality of optimized versions of the method 402/410 (e.g., first optimized method 412 and a second optimized method 414), one each for each of the predominantly used values, and writes the optimized methods to the modified destination file 416. Although not specifically shown in FIG. 4, the series of commands also write "glue" code that directs program flow to the proper optimized method based on the run time value, or if there is not an optimized method for the particular run time value, to the method 410 for general data.

In accordance with some embodiments, when a plurality of predominantly used run time values has been determined, the optimized methods overwrite the dynamic monitoring code in the modified destination file. In alternative embodiments, however, the dynamic monitoring code remains, and in the event the predominantly used run time values change over the course of executing the application program, the dynamic monitor code 408 generates new optimized methods that either replace or augment the previously generated optimized methods.

Figure 5:
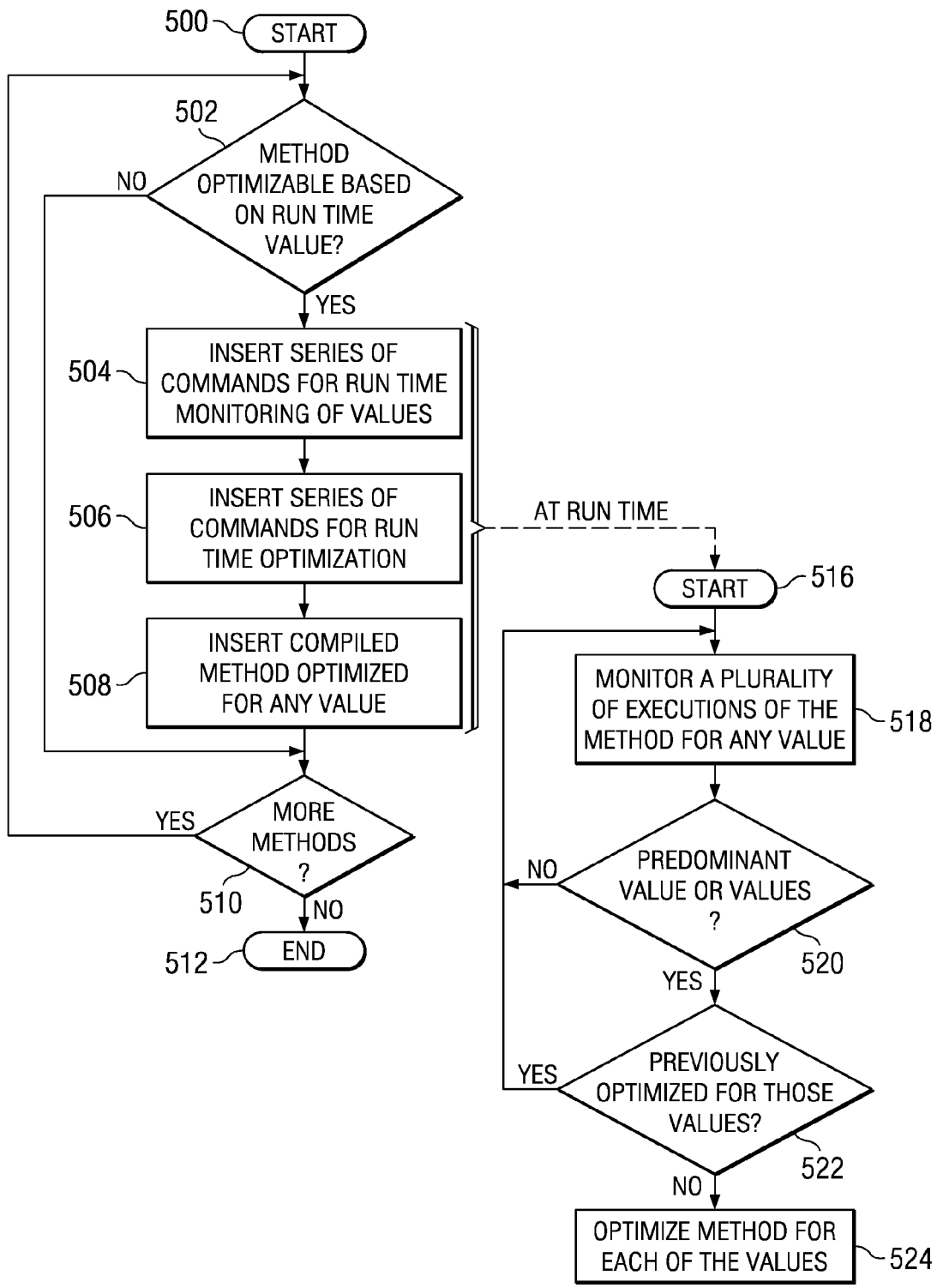
FIG. 5 illustrates a flow diagram implemented partially within a compiler and partially within an application program compiled by the compiler, in accordance with alternative embodiments of the invention.

FIG. 5 illustrates a flow diagram that is implemented partially within a compiler, and partially within an application program compiled by the compiler. More particularly, FIG. 5 illustrates the operation of the compiler and modified application program as discussed with respect to FIG. 4. The process starts (block 500), and in addition to other duties of the compiler, a determination is made as to whether the method (e.g., method 402 of FIG. 4) can be optimized based on a value available at run time (block 502). If not, a determination is made as to whether other methods exist in the application program for possible optimization (block 510). If there are no further methods, the process ends (block 512). If there are further methods, however, the process starts anew with the determination of whether the next method can be optimized based on a value available at run time (again block 502).

Still referring to FIG. 5, if the method can be optimized based on a run time value, the compiler inserts a series of commands for run time monitoring of values into the compiled version of the application program (block 504). The compiler also inserts a series of commands for run time optimization of the method (block 506), and further inserts a compiled version of the method optimized (to the extent possible) for general data (block 508). Thereafter, a determination is made as to whether more methods exist for possible run time optimization (block 510). The illustrative steps discussed to this point are preferably implemented within a compiler. The remaining steps are preferably implemented as part of the application program previously (wholly or partially) compiled by the compiler.

The run time portion of the various embodiments start (block 516) with execution of the application program, and the series of commands monitor a plurality of executions of the method optimized for general data (block 518). Based on data obtained from the monitoring, a determination is made as to whether there are any predominantly used values (block 520). If there are no predominantly used values, the illustrative method retreats to further monitoring (block 518). If there are predominantly used values (again block 520), a determination is made as to whether optimized versions of the method have already been generated for those values (block 522). If so, then the illustrative method retreats again to monitoring execution of the method optimized for general data (block 518). If, on the other hand, the illustrative method has not generated an optimized method for the predominantly used values, optimized methods are generated and written to the modified destination file (block 524). In some embodiments, each method optimized for a particular value is retained, and further optimized methods added. In cases where storage space in the modified destination file is limited, each time an optimized method is generated it may overwrite other optimized versions of the method. Further still, if storage space is an issue, the dynamic monitor code may be overwritten. Stated otherwise, once one or more predominantly used values are determined, the illustrative method may no longer perform the dynamic monitoring.

Figure 6:
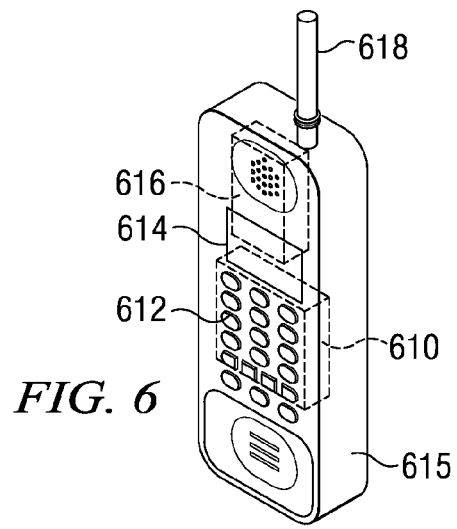
FIG. 6 illustrates a system in accordance with at least some embodiments of the invention.

System 100 may be implemented as a mobile cell phone such as that shown in FIG. 6. As shown, the mobile communication device includes an integrated keypad 612 and display 614. The JSM processor 102 and MPU processor 104 and other components may be included in electronics package 610 connected to the keypad 612, display 414, and radio frequency ("RF") circuitry 416. The RF circuitry 416 may be connected to an antenna 418.

From the description provided herein, those skilled in the art are readily able to combine software created as described with appropriate general purpose or a special purpose computer hardware to create a computer system and/or computer subcomponents embodying aspects of the invention, to create a computer system and/or computer subcomponents for carrying out the method embodiments of the invention, and/or to create a computer-readable medium storing a software program to implement method aspects of the various embodiments. Moreover, the embodiments of the illustrative methods could be implemented together in a single program (with various subroutines), or split up into two or more programs executed on the processor.

While the various embodiments of the invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. For example, compiling in accordance with embodiments of the invention may take place statically (ahead-in-time) or dynamically. Each and every claim is incorporated into the specification as an embodiment of the present invention.

Figure 7:
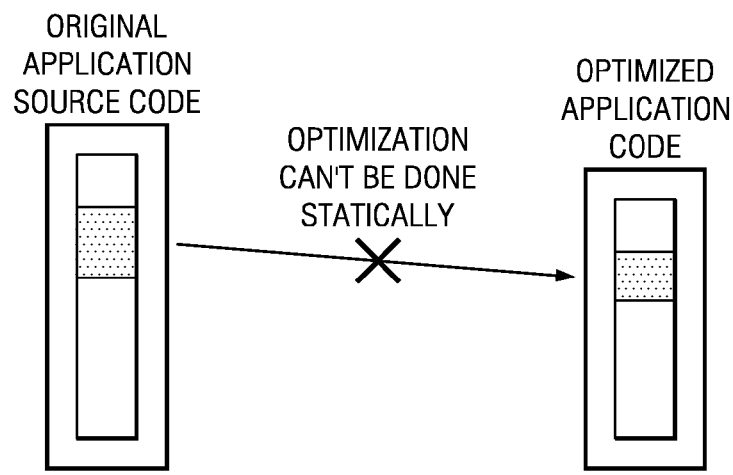
FIGS. 7-11 illustrate graphically operation of a compiler and application program in accordance with embodiments of the invention.
Figure 8:
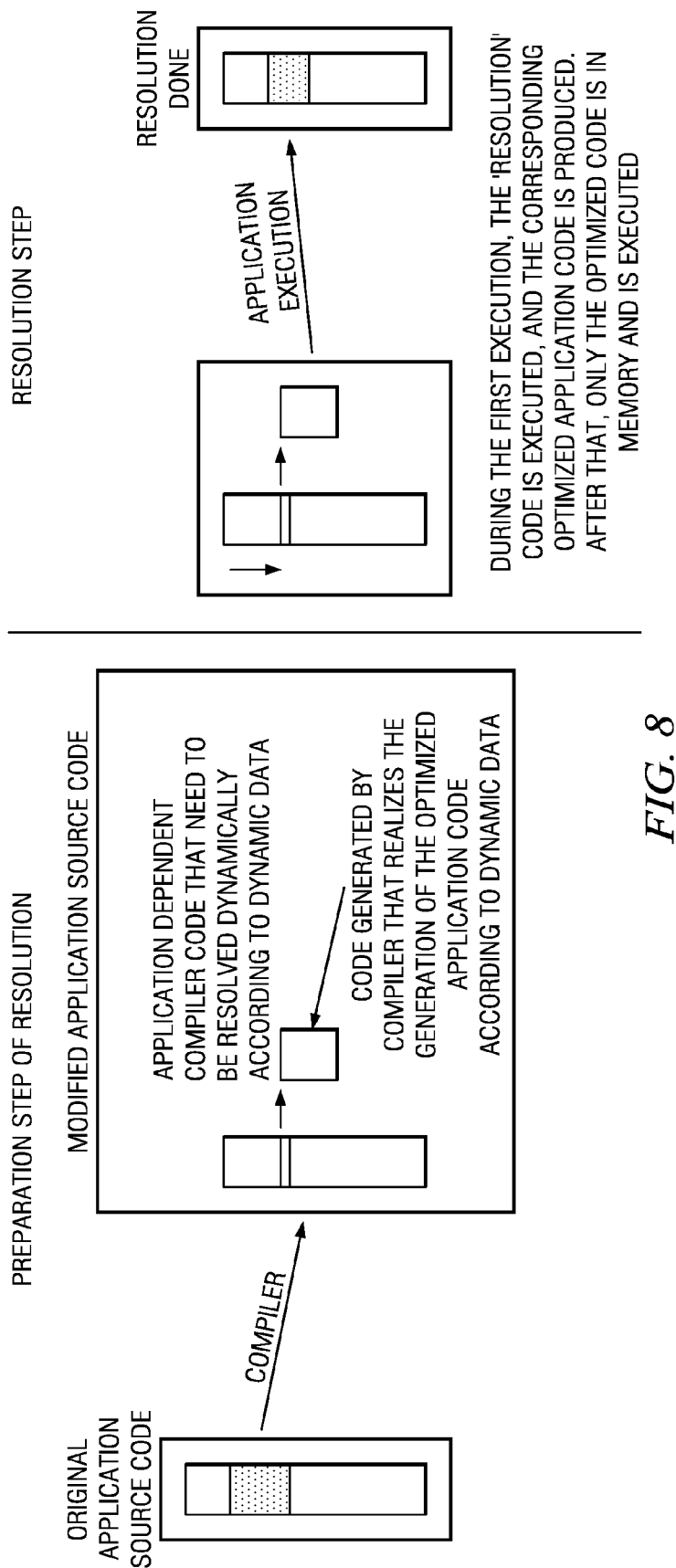

Reference is made to FIGS. 7 and 8. Compilation can be done either on static or in a dynamic program analysis. For dynamic compilers, they are necessary online and embedded on the platform. For static compilers they can be either online or offline. In the case of online static compilers for Java, a ahead in time compiler that runs during the loading of the class files, its execution time must be short to be compatible with user requirements. The problem is that due to execution time constraints, such online static or dynamic compilers can't do everything when compiling. If required, the runtime decides to compile some parts of code after the application loading and during its execution. But in that case, all the work of the compiler has to be done again from Zero.

Our approach is to define a way for compilers to make a dynamic resolution of a compiler work. In the context of Java applications, that provides a way to reuse efficiently work that can be done by the online compiler during the loading of the application. It can be generalized to a generic method for compilers not only for embedded platforms, but for any kind of compilation software that requires a dynamic data to solve the compilation scheme.

Let's take an example. Suppose that the ahead in time compiler identifies a loop inside a method. Suppose that that loop uses an object field value as number of time the loop need to be executed. Even if the compiler can detects that the object filed if wrote only one time by the program, it can't knows the final value that is computed during the execution of the application and that depends on the application running. That's really too bad because if the compiler knew that data it could optimise more aggressively the application.

Figure 9:
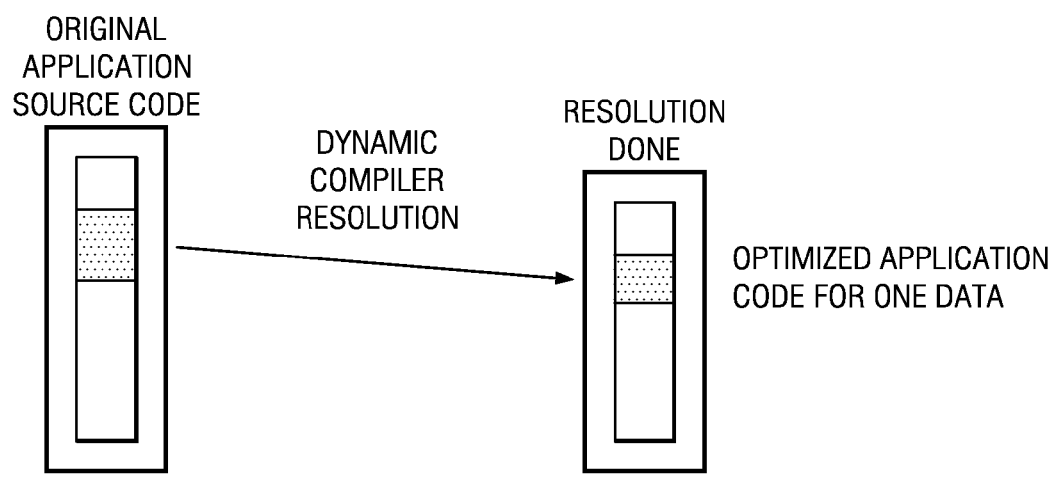
Figure 10:
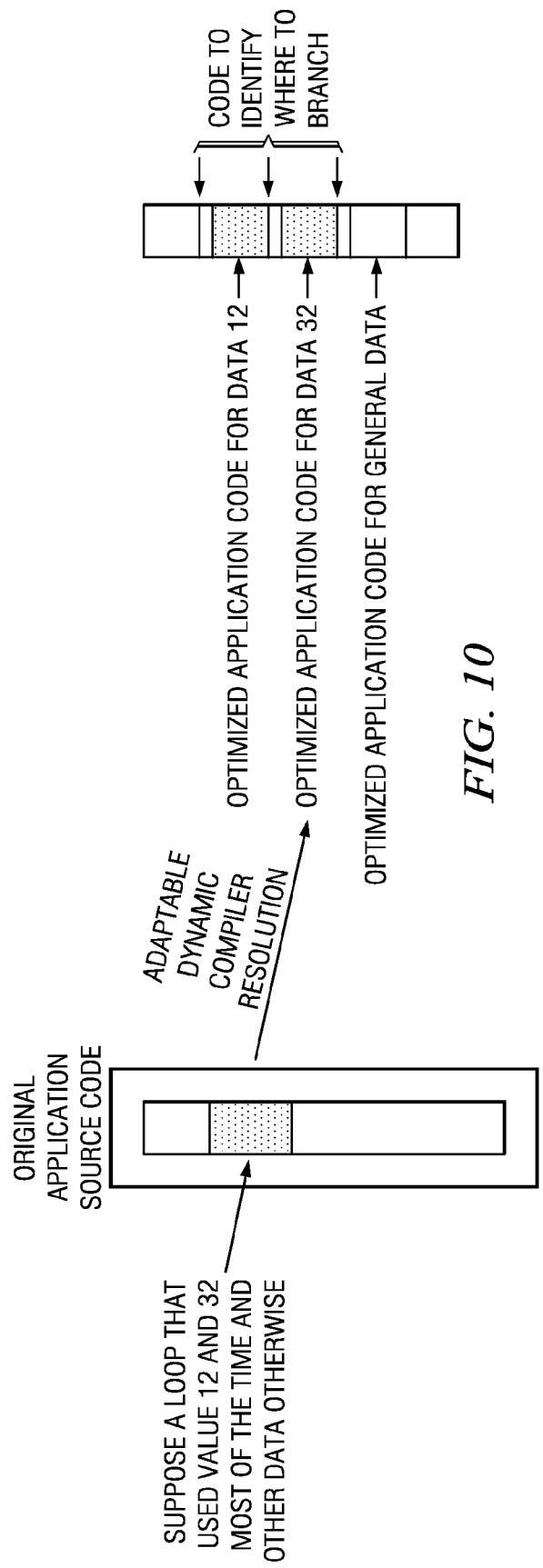
Figure 11:
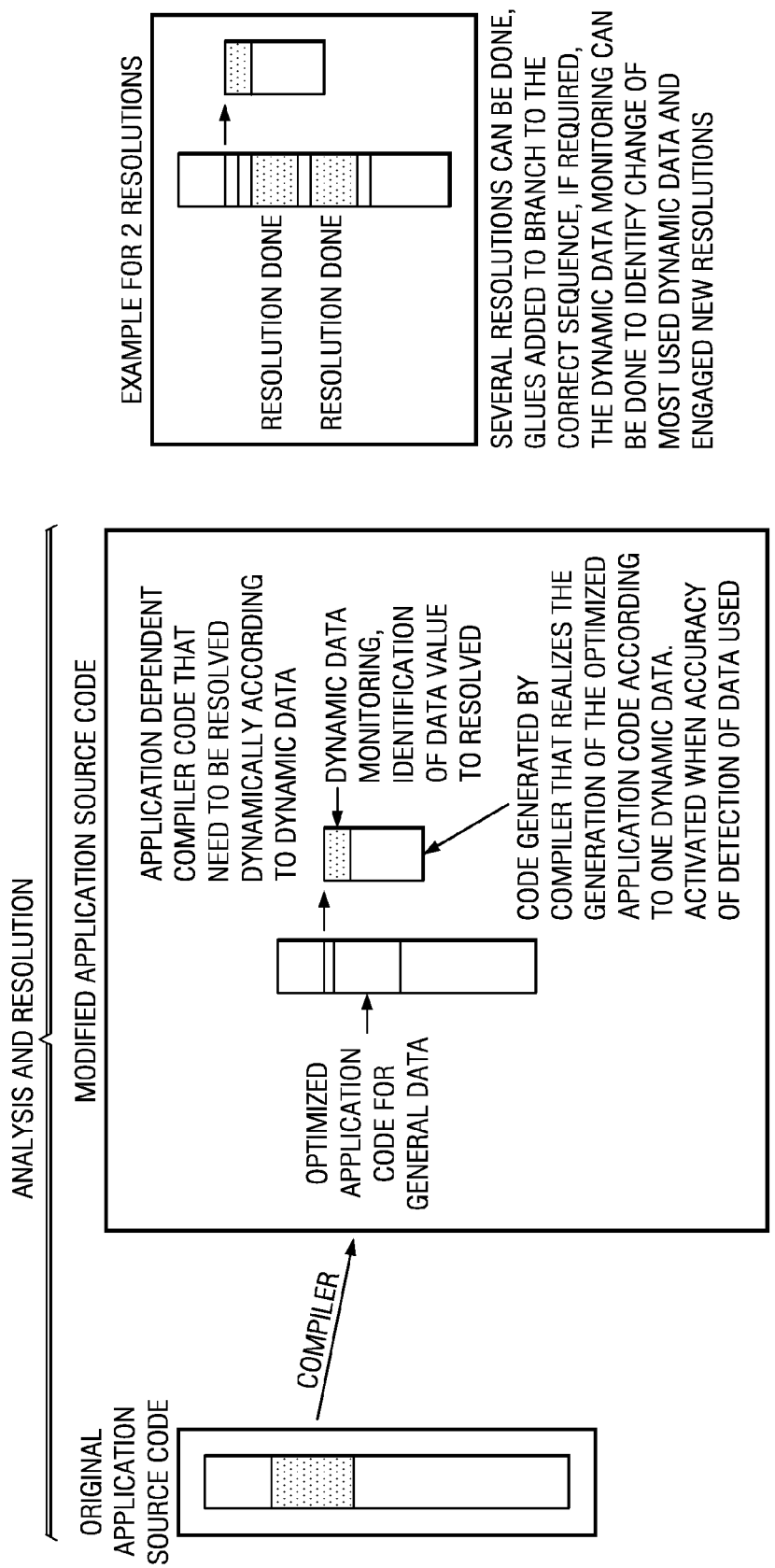

Our approach can solve that problem easily. During the ahead in time compilation, the compilers identifies the loop. Then, it generates a code that can generate itself the aggressive optimisation taking in entry the required dynamic data. The ahead in time modifies the application code source by inserting in the original code a call to the compiler code. That can be a micro sequence code or a branch to a piece of code. The first execution of the code takes the input data and generates the optimised code for the application. Reference is made to FIGS. 9-11. We propose a solution to define a way for compilers to make a dynamic resolution of a compiler work. In the context of Java applications, that provides a way to reuse efficiently work that can be done by the online compiler during the loading of the application. It can be generalized to a generic method for compilers not only for embedded platforms, but for any kind of compilation software that requires a dynamic data to solve the compilation scheme.

Our approach can solve that problem easily. During the ahead in time compilation, the compilers identifies a piece of code like a loop. Then, it generates a code that can generate itself, the aggressive optimisation taking in entry the required dynamic data. The ahead in time modifies the application code source by inserting in the original code a call to the compiler code. That can be a micro sequence code or a branch to a piece of code. The first execution of the code takes the input data and generates the optimised code for the application.

The problem of such technique is when the dynamic data change according to application requirements and regularity behavior. For example, suppose a loop that uses value 12 and then, value 32, then again 12, then again 32. Our previous solution solves the problem for the first used dynamic data, and the optimisation of the compiler can't be done for other used data. Moreover, if another data is used only one time, it doesn't work.

We propose a way to use the dynamic compiler resolution, which is a solution that requires only one dynamic data value, for a set of data. We call that adaptable dynamic compiler resolution. As shown on the figures, the approach is to introduce a basic monitoring in the resolution treatment. The compiler reserves the memory space for a number of possible resolutions and keeps in memory the original treatment. For example, suppose an application that has a loop that most of the time uses value 12 and 32 and sometimes another value. The adaptable resolution will be to resolve the code for 12 and 32 and place the general code of the loop for other data. Thus, for most used values, the optimisation is fully done.

The compiler must take care of the available memory and also of the time penalty required to make the identification of the most use data. Several ways can be used to achieve that like making a kind of hotspot, or by generating the first used values. We will describe fully these strategies. Thanks to that technique, a general resolution scheme can be applied by compilers. That technique can also be applied to other pieces of software where dynamic data are used. At last, that technique supports fully the dynamic change of the data used by the application. For example, if a loop uses 12 and 32 for ten minutes and then 64 and 48 after, the adaptable resolution could identifies that 12 and 32 are not used anymore by the application and that 64 and 48 must be resolved. That's due because our technique is done dynamically. A brief description of the solutions is described in the technical description.

A main benefit of a dynamic resolution is that the compiler has not to be launched again for making a dynamic compilation and supports multiple range of value of data used by making a dynamic identification of what are the best dynamic data to use for resolution. Thanks to that technique, a general resolution scheme can be applied by compilers. That technique can also be applied to other pieces of software where dynamic data are used. At last, that technique supports fully the dynamic change of the data used by the application. It can be applied to any kind of resolution. We introduce a small overhead of the application for the executions where the monitoring of data is engaged, but after that the application code is more efficient and the performance can be increased significantly. That means energy consumption is reduced and overall performance is increased.

What is claimed is:

1. A computer-implemented method comprising:
   identifying during compilation a code portion in source code of an application, wherein the code portion requires a dynamic data value, wherein a dynamic data value is a data value that changes based on execution behavior of the application;
   generating a compiled version of the code portion optimized for a general value of the dynamic data value;
   generating a series of instructions to be executed when the application is executed, wherein the series of instructions is configured
      to monitor a plurality of executions of the compiled version of the code portion to determine a first frequently occurring value of the dynamic data value,
      to generate a first optimized code portion corresponding to the code portion using the first frequently occurring value, wherein subsequent execution flow is directed to the first optimized code portion when the first frequently occurring value is used;
      to monitor the ongoing execution of the compiled version of the code portion to determine one or more additional frequently occurring values of the dynamic data value, and
      to generate new optimized code portions using the additional frequently occurring values, wherein subsequent execution flow is directed to the new optimized code portions when the corresponding new frequently occurring value is used and wherein one of the new optimized code portions replaces the first optimized code code portion; and
   inserting the series of instructions in a compiled version of the source code.

2. The computer-implemented method as defined in claim 1, wherein the series of instructions is further configured to generate glue code to cause the subsequent execution flow to be directed to the first optimized code portion when the first frequently occurring value is used.

3. The computer-implemented method as defined in claim 1, wherein the series of instructions is further comfigured to monitor values of the dynamic data value to determine that the first frequently occurring value is no longer used and to replace the first optimized code portion with a second optimized code portion generated using a new frequency occurring value.

4. The computer-implemented method as defined in claim 1, wherein the compiled version of the source file compromises Java bytecodes that are directly executable by a precursor.

5. The computer-implemented method as defined in claim 1, wherein the soure file comprises Java bytecodes.

6. The computer-implemented method as defined in claim 1, wherein the series of instructions comprises a micro-sequence.

7. A computer readable medium storing a computer program that when executed by a processor, performs a method comprising:
   identifying during compilation a code portion in source code of an application, wherein a dynamic data value is a data value that changes based on execution behavior of the application;
   generating a compiled version of the code portion optimitzed for a general value of the dynamic data value;
   generating a series of instructions to be executed when the application is executed, wherein the series of instructions is configured
      to monitor a plurality of executions of the compiled version of the code portion to determine a first frequently occurring value of the dynamic data value, and
      to generate a first optimized code portion corresponding to the code portion using the first frequently occurring value of the dynamic data value, and
      to generate a first optimized code portion corresponding to the code portion using the first frequently occurring value, wherein subsequent execution flow is directed to the first optimized code portion when the first frequently occurring value is used;
      to monitor the ongoing execution of the compiled version of the code portion to determine one or more additional frequently occurring values of the dynamic data value, and
      to generate new optimized code portions using the additional frequently occurring values, wherein subsequent execution flow is directed in the new optimized code portions when the corresponding new frequently occurring value is used and wherein one of the new optimized code portions replaces the first optimized code code portion; and
   inserting the series of instructions in a compiled version of the source code file.

8. The computer readable medium as defined in claim 7, wherein the series of instructions is further configured to generate glue code to cause the subsequent execution flow to be directed to the first optimized code portion when the first frequently occurring value is used.

9. The computer readable medium as defined in claim 7, wherein the compiled version of the source file comprises Java bytecodes that are directly executable by a processor.

10. The computer readable medium as defined in claim 7, wherein the source file comprises Java bytecodes.

11. The computer readable medium as defined in claim 7, wherein the series of instructions is further configured to monitor values of the dynamic data value to determine that the first frequently occurring value is no longer used and to replace the first optimized code portion with a second optimized code portion generated using a new frequently occurring value.

12. The computer readable medium as defined in claim 7, wherein the series of instructions comprises a micro-sequence.

13. A system comprising;
a memory configured to store a source code of an application;
a processor coupled to the memory; and
a compiler configured to execute on the processor to compile the source code, wherein compiling the source code portion of the source code, wherein the code portion requires a dynamic data value, wherein a dynamic data value is a data that changes based on execution behavior of the application;
generating a compiled version of the code portion optimized for a general value of the dynamic data value;
generating a series of instructions to be executed when the application is executed wherein the series of instructions is configured
    to monitor a plurality of executions of the compiled version of the code portion to determine a first frequently occurring value of the dynamic data value,
    to generate a first optimized code portion corresponding to the code portion using the first frequently occurring value, wherein subsequent execution flow is directed to the first optimized code portion when the first frequently occurring value is used,
    to monitor the ongoing execution of the compiled version of the code portion to determine one or more additional frequently occurring values of the dynamic data value and
    to generate new optimized code portions using the additional frequently occurring values wherein subsequent execution flow is directed to the new optimized code portions when the corresponding new frequently occurring value is used and wherein one of the new optimized code portions replaces the first optimized code code portion; and
    inserting a call to the series of instructions in a compiled version of the source code file.

14. The system as defined in claim 13 wherein the series of instructions is further configured to generate glue code to cause the subsequent execution flow to be directed to the first optimized code portion when the first frequently occurring value is used.

15. The system as defined in claim 13 wherein the source file comprises Java bytecodes.

16. The system as defined in claim 13 wherein the compiled version of the source file comprises Java bytecodes that are directly executable by the processor.

17. The system as defined in claim 13 wherein the series of instructions is further configured to monitor values of the dynamic data value to determine that the first frequently executing value is no longer used and to replace the first optimized code portion with a second optimized code portion generated using a new freqeuntly occurring value.

* * * * *